United States Patent [19]

Smith

[11] 4,071,923
[45] Feb. 7, 1978

[54] HAND-HELD MEAT SKINNING DEVICE

[75] Inventor: David W. Smith, Des Moines, Iowa

[73] Assignee: Townsend Engineering Company, Des Moines, Iowa

[21] Appl. No.: 711,584

[22] Filed: Aug. 4, 1976

[51] Int. Cl.² ............................................. A22B 5/16
[52] U.S. Cl. ........................................... 17/21; 17/67
[58] Field of Search .................... 17/56, 57, 61, 62, 64, 17/66–69, 16, 18, 19, 21, 29, 46, 50; 99/540, 584, 585, 588, 593

[56] References Cited

U.S. PATENT DOCUMENTS

| | | | |
|---|---|---|---|
| 1,506,510 | 8/1924 | Thuau | 17/21 |
| 1,604,692 | 10/1926 | Hausamann | 17/21 |
| 1,784,334 | 12/1930 | Callum | 17/66 X |
| 1,982,083 | 11/1934 | Strand | 17/67 |
| 2,547,237 | 4/1951 | Townsend | 17/67 |
| 2,720,002 | 10/1955 | Waters | 17/18 |
| 2,884,658 | 5/1959 | Johnson | 17/67 |
| 3,667,521 | 6/1972 | Beasley | 17/62 X |
| 3,717,903 | 2/1973 | Townsend | 17/67 |
| 3,931,665 | 1/1976 | Townsend | 17/21 |

FOREIGN PATENT DOCUMENTS

| | | | |
|---|---|---|---|
| 1,237,923 | 3/1967 | Germany | 17/21 |
| 2,163,605 | 3/1973 | Germany | 17/21 |

Primary Examiner—David H. Brown
Attorney, Agent, or Firm—Zarley, McKee, Thomte, Voorhees & Sease

[57] ABSTRACT

A hand-held meat skinning device comprising a housing containing an air driven motor positioned therein which is in communication with a source of air under pressure. A pivotal lever is provided on the housing for actuation of the air motor. A guard ring is provided on the housing adjacent the lower end for protecting the operator's hand and for preventing the actuation lever from being depressed when the unit is placed upon a supporting surface. A laterally extending housing portion is provided at the forward end of the device and has a toothed roll rotatably mounted thereon which is driven by the air motor positioned in the housing. The laterally extending housing portion is provided with a recessed or cut-away portion to expose the periphery of the toothed roll. A plurality of spaced-apart grooves are formed in the periphery of the toothed roll and a stripper blade is positioned in the upper portions of the grooves in a "floating" condition and maintained therein by a bolt. A shoe clamp is secured to the underside of the laterally extending housing portion and includes a pair of spaced-apart edging members or fingers which extend forwardly of the skinning blade positioned on the shoe clamp.

9 Claims, 7 Drawing Figures

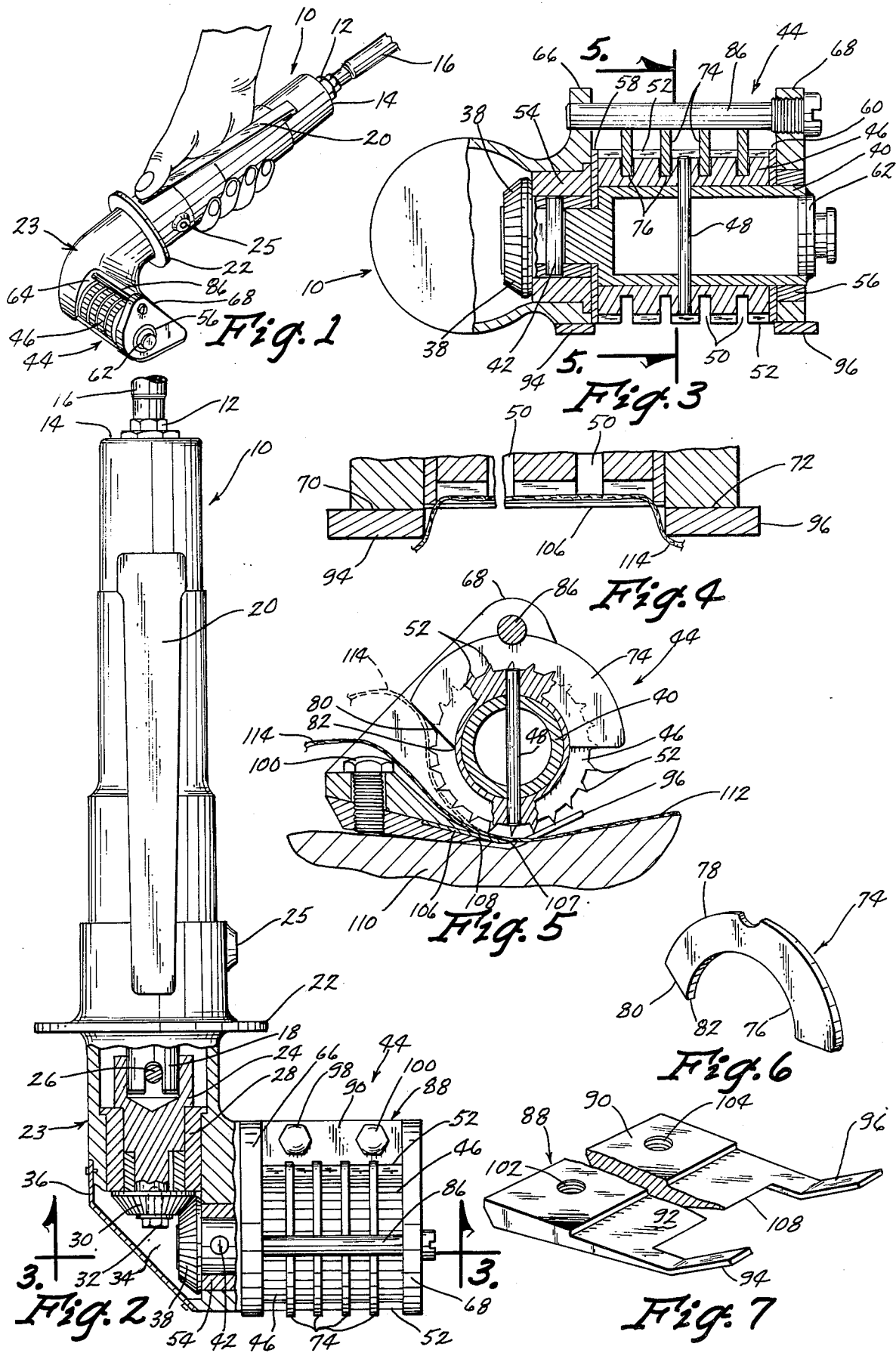

HAND-HELD MEAT SKINNING DEVICE

BACKGROUND OF THE INVENTION

Conventional skinning machines such as those manufactured by Townsend Engineering Company of Des Moines, Iowa have been generally satisfactory in removing the skin from meat products. However, the conventional skinning machines miss certain portions of the skin due to irregularities in the product or the skin.

Therefore, it is a principle object of the invention to provide a hand-held meat skinning device.

A still further object of the invention is to provide a hand-held meat skinning device which permits an operator to remove patches of skin which were missed by a conventional skinning machine.

A still further object of the invention is to provide a hand-held meat skinning device including a toothed roll having a plurality of stripper blades floating in grooves formed therein.

A still further object of the invention is to provide a hand-held meat skinning device including a pair of edging shoe members which extend forwardly of the skinning blade.

A still further object of the invention is to provide a hand-held meat skinning device which is easily cleaned.

A still further object of the invention is to provide a hand-held meat skinning device including components which are easily replaced.

A still further object of the invention is to provide a hand-held meat skinning device including a guard ring extending outwardly from the housing which protects the operator's hand and which prevents the motor from being inadvertently actuated.

A still further object of the invention is to provide a hand-held meat skinning device which is economical to manufacture, durable in use and refined in appearance.

BRIEF DESCRIPTION OF THE DRAWINGS

FIG. 1 is a front perspective view of the device of this invention:

FIG. 2 is a plan view of the device with portions thereof cut away to more fully illustrate the invention:

FIG. 3 is a sectional view as seen on lines 3—3 of FIG. 2:

FIG. 4 is a fragmentary sectional view illustrating the relationship of the shoe clamp fingers, skinning blade and toothed roll:

FIG. 5 is a sectional view as seen on lines 5—5 of FIG. 3:

FIG. 6 is a perspective view of one of the stripper blades; and

FIG. 7 is a fragmentary perspective view of the shoe clamp portion of the invention.

DESCRIPTION OF THE PREFERRED EMBODIMENT

The numeral 10 refers to an elongated housing having an air fitting 12 in its rearward end 14. Hose 16 is connected to fitting 12 and extends to a source of air under pressure for driving the conventional air motor (not shown) positioned within housing 10. The air motor includes a drive or power shaft 18. The air motor is actuated by the pivotal lever 20 in the manner shown in FIG. 1. Guard ring 22 extends outwardly from housing 10 as seen in FIGS. 1 and 2 to protect the operator's hand (FIG. 1) and to prevent the actuating lever 20 from being depressed when the unit is placed upon a supporting surface.

Housing member 23 is detachably secured to the forward end of housing 10 by means of screw 25. Stub shaft 24 is connected to the end of shaft 18 by pin 26 (FIG. 2) and is rotatably mounted within the forward ends of housing member 23 by means of bushing 28. Bevel gear 30 is secured to the forward end of stub shaft 24 by screw 32 as illustrated in FIG. 2. Housing member 23 is provided with an access opening 34 which is selectively closed by means of shield or cover 36.

Bevel gear 38 is secured to one end of shaft 40 by means of pin 42 (FIG. 3). Shaft 40 is rotatably mounted in the laterally extending or "offset" portion 44 of housing member 23. Toothed roll 46 is mounted on shaft 40 for rotation therewith by means of pin 48 extending therethrough as seen in FIG. 3. The periphery of roll 46 is provided with spaced apart annular grooves 50 formed therein and a plurality of teeth 52 formed therein between the grooves 50. Shaft 40 is rotatably mounted in bushings 54 and 56 and has washers 58 and 60 positioned thereon as seen in FIG. 3. Plug 62 is secured to the outer end of shaft 40 to close the same.

Housing portion 44 has a recessed or cut-away area 64 formed therein to expose the roll 46 between the shoes 66 and 68. Shoes 66 and 68 have substantially flat shoe portions 70 and 72 at their lower ends respectively.

The numeral 74 refers to a plurality of arcuate stripper blades having a semi-circular inside edge 76 and a semi-circular outer edge 78. The rearward end of inside edge 76 is angled at 80 to provide a sharp point 82 positioned closely adjacent the roll 46. The outer edge 78 of blade 74 has a notch 84 formed therein adapted to receive bolt 86 (FIG. 3). The blades 74 are positioned in the upper portions of grooves 50 in a "floating" manner and maintained therein by the bolt 86 which extends between shoes 66 and 68.

The numeral 88 designates a shoe clamp comprising a rearward base portion 90, blade support portion 92 and fingers 94 and 96 which extend forwardly therefrom in a spaced apart relationship. Base portion 90 is secured to the underside of housing portion 44 by screws 98 and 100 extending through housing portion 44 and being threadably received by threaded openings 102 and 104 respectively. Blade 106 is mounted on blade support portion 92 and has its leading cutting edge 107 disposed forwardly of edge 108 of shoe clamp 88.

In operation, hose 16 would be connected to a source of air under pressure to permit the motor within the housing to be actuated as desired through the use of the pivotal lever 20. As seen in FIG. 1, the lever 20 is positioned on the housing 10 so that the lever may be depressed in a convenient manner. The guard ring 22 is positioned on the housing to protect the operator's hand from slipping downwardly on the housing into engagement with the toothed roll. The guard ring 22 also prevents the lever 20 from actuating the motor when the unit is layed upon a supporting surface.

The unit is grasped by the operator as illustrated in FIG. 1 and is placed into contact with the skin to be removed from the meat product referred to generally by the reference numeral 110. Actuation of the motor causes the roll 46 to be rotated in a clockwise direction as viewed in FIG. 5. The teeth on the roll grip the skin 112 as indicated as 114 in FIG. 5 and moves upwardly and rearwardly relative to the rotating roll. The free-floating stripper elements 74 strip the severed skin from the roll as illustrated by broken lines in FIG. 5. The stripper elements 74 are easily replaced by removing the bolt 84 from elements 66 and 68. The stripper elements 74 tend to pivot about the bolt 86 which permits the elements to "float" within the grooves in the roll 46.

The fingers 94 and 96 extend forwardly and upwardly relative to the skinning blade and the roll 46 and prevent the skin from binding on the opposite or outer ends of the roll 46 as illustrated in FIG. 4. The device is easily disassembled for cleaning purposes and/or parts replacement. As previously stated, the stripper elements 74 may be removed from the device upon the removal of the bolt 86. Pin 48 is then removed which permits the shaft 40 to be removed from the housing portion 44 (to the right as viewed in FIG. 3). Roll 46 may then be removed from the housing portion 44. The skinning blade 106 is easily removed by simply removing bolts 98 and 100 which causes the separation of the shoe clamp 88 from the housing portion 44. With the shoe clamp 88 removed, the blade 106 may be removed therefrom and replaced by another skinning blade.

Thus it can be seen that a novel hand-held meat skinning device has been provided which accomplishes at least all of its stated objectives.

I claim:

1. A hand-held meat skinning device comprising, an elongated housing having first and second ends, a motor positioned in said housing, a skinning blade mounted at said second end of said housing, a rotatable gripping roll positioned above said skinning blade for gripping the skin being removed from the meat, means connecting said motor and said gripping roll for causing rotation of said roll, actuation means on said housing connected to said motor to permit the operator to actuate said motor, said actuation means comprising a lever pivotally connected to said housing, and a guard ring extending outwardly from said housing adjacent said second end to prevent actuation of said lever when the device is laid upon a supporting surface.

2. A hand-held meat skinning device comprising, an elongated housing having first and second ends, a motor positioned in said housing, a skinning blade mounted at said second end of said housing, a rotatable gripping roll positioned above said skinning blade for gripping the skin being removed from the meat, means for connecting said motor and said gripping roll for causing rotation of said roll, actuation means on said housing connected to said motor to permit the operator to actuate said motor, said gripping roll having a plurality of spaced-apart grooves formed therein, a stripper element positioned in each of said grooves for stripping the severed skin from the roll, each of said stripper elements being semi-circular and having an inner edge positioned in the said groove, each of said stripper elements having a pointed lower rearward portion for engagement with the severed skin, each of said stripper elements being positioned in one of said grooves in a floating manner.

3. The device of claim 2 wherein said roll has an upper end, said stripper elements being positioned on said roll at the upper portion thereof, each of said stripper elements having a notch formed in its outer edge, and a retainer means operatively secured to said housing and extending through said notches in said stripper elements to maintain said stripper elements in said grooves.

4. A hand-held meat skinning device comprising, an elongated housing having first and second ends, a motor positioned in said housing, a skinning blade mounted at said second end of said housing, a rotatable gripping roll positioned above said skinning blade for gripping the skin being removed from the meat, means connecting said motor and said gripping roll for causing rotation of said roll, actuation means on said housing connected to said motor to permit the operator to actuate said motor, a skinning blade support secured to said housing below said gripping roll, said skinning blade being mounted on said skinning blade support below said roll, and a pair of spaced-apart fingers extending forwardly from said blade support from opposite ends of said skinning blade.

5. The device of claim 4 wherein said fingers are flat and extend forwardly and upwardly relative to said skinning blade.

6. A hand-held meat skinning device comprising, an elongated housing having first and second ends, a motor positioned in said housing, a skinning blade mounted at said second end of said housing, a rotatable gripping roll positioned above said skinning blade for gripping the skin being removed from the meat, means connecting said motor and said gripping roll for causing rotation of said roll, actuation means on said housing connected to said motor to permit the operator to actuate said motor, said housing having a laterally extending housing portion with upper and lower portions and rearward and forward ends, a skinning blade support detachably secured to said laterally extending housing portion adjacent the lower end thereof, said skinning blade being detachably mounted on said skinning blade support, said gripping roll being rotatably mounted on said laterally extending housing portion above said skinning blade support and said skinning blade, and a pair of fingers extending forwardly from said skinning blade support at opposite sides of said skinning blade.

7. The device of claim 6 wherein said fingers extend forwardly and upwardly relative to said skinning blade at opposite ends of said gripping roll for preventing the skin from binding on the opposite ends of said gripping roll.

8. The device of claim 6 wherein said skinning blade support has a substantially flat bottom surface for engagement with the meat product.

9. The device of claim 6 wherein said gripping roll has a plurality of spaced-apart annular grooves formed therein and a stripper element movably mounted in each of said grooves at the upper portion thereof, each of said stripper elements having a rearwardly and downwardly extending portion.

* * * * *